US007731843B2

(12) United States Patent
Pinchin

(10) Patent No.: US 7,731,843 B2
(45) Date of Patent: Jun. 8, 2010

(54) METHOD AND APPARATUS FOR TREATMENT OF WATER FOR AN INJECTION WELL

(75) Inventor: Dave Pinchin, Hundvåg (NO)

(73) Assignee: Sørco AS, Stavanger (NO)

( * ) Notice: Subject to any disclaimer, the term of this patent is extended or adjusted under 35 U.S.C. 154(b) by 1040 days.

(21) Appl. No.: 10/552,202

(22) PCT Filed: Mar. 30, 2004

(86) PCT No.: PCT/NO2004/000091

§ 371 (c)(1),
(2), (4) Date: Mar. 6, 2006

(87) PCT Pub. No.: WO2004/090284

PCT Pub. Date: Oct. 21, 2004

(65) Prior Publication Data

US 2006/0243670 A1 Nov. 2, 2006

(30) Foreign Application Priority Data

Apr. 8, 2003 (NO) .................................. 20031569

(51) Int. Cl.
*C02F 1/00* (2006.01)
(52) U.S. Cl. .................... 210/198.1; 210/749; 210/206; 210/748.1; 166/266
(58) Field of Classification Search ................. 166/266; 210/748, 739, 600, 749, 206, 198.1
See application file for complete search history.

(56) References Cited

U.S. PATENT DOCUMENTS

| 3,727,760 | A | * | 4/1973 | Soriano et al. ............... 210/101 |
| 4,986,902 | A | * | 1/1991 | Serna ........................... 210/86 |
| 5,208,461 | A | * | 5/1993 | Tipton ........................ 250/436 |
| 6,183,646 | B1 | | 2/2001 | Williams et al. |
| 6,196,314 | B1 | * | 3/2001 | Chen ........................... 166/275 |
| 6,382,320 | B1 | | 5/2002 | Tilbrook et al. |
| 6,419,458 | B1 | | 7/2002 | Lower et al. |
| 2003/0069142 | A1 | * | 4/2003 | Beal ........................... 507/200 |

FOREIGN PATENT DOCUMENTS

WO WO 9730268 8/1997

* cited by examiner

*Primary Examiner*—Walter D Griffin
*Assistant Examiner*—Cameron J Allen
(74) *Attorney, Agent, or Firm*—Knobbe Martens Olson & Bear LLP

(57) ABSTRACT

The invention concerns a method and an apparatus (10) for treatment of water (26) to be injected into a subsea injection well, the apparatus (10) being disposed in water overlying the well, preferably on a water bed (12). The invention is characterized in that the apparatus (10) contains at least one receptacle (38, 40, 46, 48, 50) provided with at least one water-soluble solid-state chemical (42, 52, 54, 56) for treatment of the injection water (26). The water (26) is brought into contact with the at least one chemical (42, 52, 54, 56), causing it to gradually dissolve and mix with the water (26), after which treated water (26') is led into an injection stream to the injection well.

21 Claims, 1 Drawing Sheet

METHOD AND APPARATUS FOR TREATMENT OF WATER FOR AN INJECTION WELL

FIELD OF THE INVENTION

Figure 1:
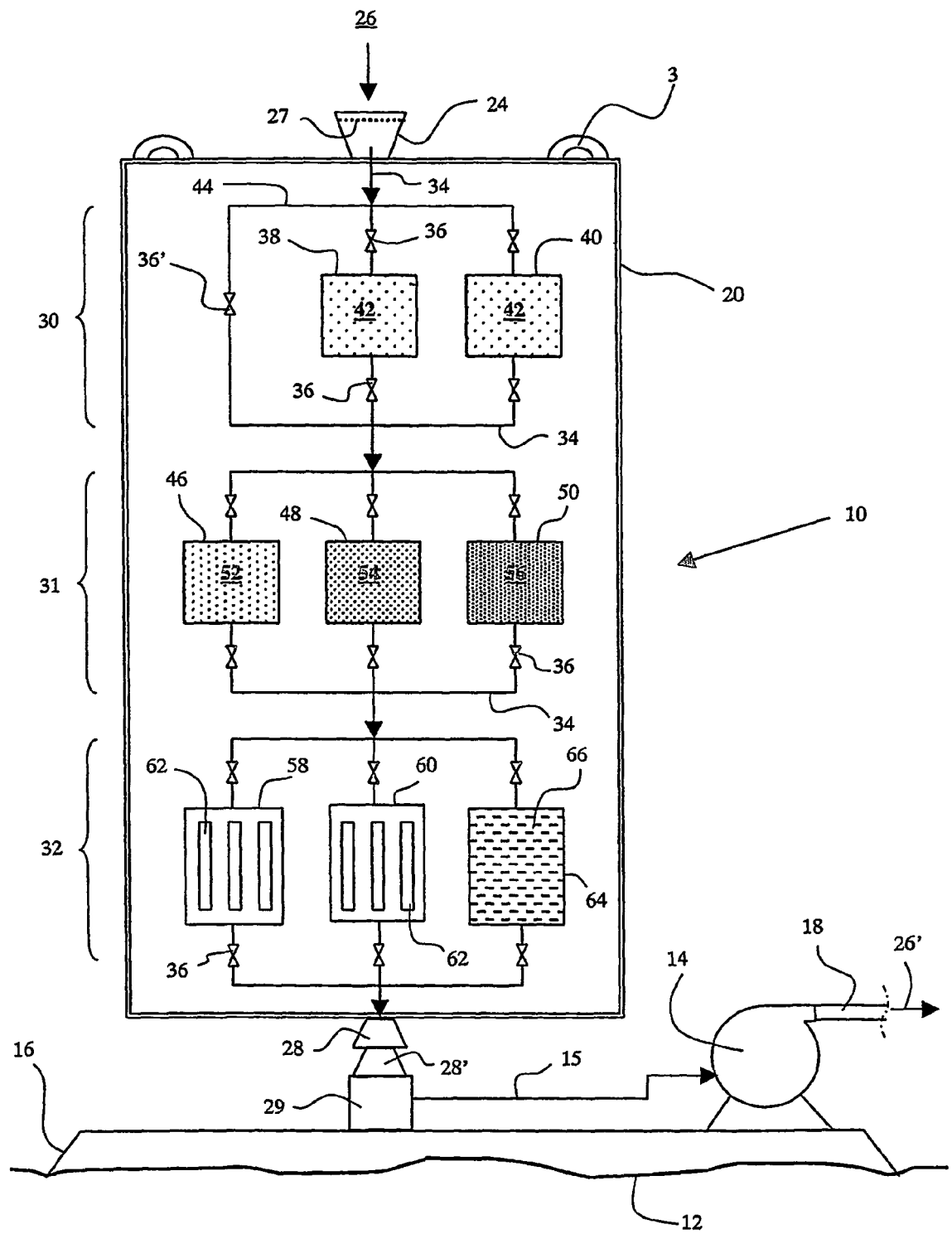

The invention concerns a method and an apparatus for treatment of water to be injected into a subsea injection well, preferably in connection with petroleum recovery. The apparatus is disposed in a body of water overlying the well, for example in the sea or in a lake, and preferably at the bottom thereof. The water to be injected may be taken from this body of water, and the water thus may consist of untreated seawater or untreated fresh water. Alternatively, all or parts of the water may consist of so-called produced water, which is water that has been separated from a well production stream in a separation installation, and which must be transported onwards to the injection well.

By using the present method and apparatus, both treatment and pumping of injection water may be carried out by means of equipment placed under water, for example on a seabed, and without having to use a surface installation provided with such equipment.

BACKGROUND OF THE INVENTION

In order to recover crude oil from offshore installations, large investments are required. The largest, simplest and/or most productive petroleum reservoirs therefore are most profitable to develop and produce. Many smaller, more complex and/or less productive reservoirs, however, are considered to be marginal, inasmuch as they are economically unattractive, and they therefore remain untouched. This is unfortunate.

When assessing the economic viability of a hydrocarbon reservoir, many factors are considered, including prior art available for development and recovery of the petroleum resource. Many marginal reservoirs are considered insufficiently cost-effective due to prior art techniques providing inadequate performance and/or poor technical efficiency and/or an unacceptable technical extent. Innovations in such technical fields, however, may open for profitable recovery of such marginal hydrocarbon reservoirs, but they may also increase the recovery factor and the profitability of existing production facilities.

PRIOR ART AND DISADVANTAGES THEREOF

In order to avoid large investments associated with construction and installation of surface arrangements offshore, subsea-placed production equipment is increasingly sought-after, the production stream being conveyed via pipelines to the shore or to existing, remote surface structures, for example platforms. This is favourable in connection with primary recovery of petroleum resources and may also improve the profitability of some marginal resources.

In connection with enhanced recovery of petroleum resources, however, use is made of a surface installation, for example a bottom-fixed platform or a floating installation. A common secondary recovery method that increases the production rate of a petroleum reservoir and recoverable reserves is to inject water into the reservoir. The injection water is pumped into the reservoir at a pressure that forces additional hydrocarbons out of the reservoir. Such a water injection operation is very expensive and is improper in connection with marginal resources.

Said surface installation is provided with suitable equipment for treating untreated water that is sucked in from the body of water surrounding the surface installation. The surface installation is also provided with suitable equipment for pumping the treated water down into the injection well and into the petroleum reservoir. The injection water may be pumped down via a riser extending from a nearby surface installation. The water may also be pumped from a remote surface installation via a subsea, high-pressure injection pipeline and onwards to said subsea production equipment, which includes, among other things, a wellhead for the relevant well. It may also be of interest to use pigging equipment in association with the high-pressure injection pipeline.

Said prior art equipment on the surface installation typically comprises the following equipment: water lift pumps, water filtering equipment, water de-aeration equipment, low-pressure booster pumps, high-pressure injection pumps, feed pumps for adding various chemicals into the injection water, and various other types of water treatment equipment.

The chemicals added to the injection water on the surface installation usually are in a liquid state, and they are added for various reasons. Typical examples of generic water treatment chemicals are:

Chlorine: used as an organism growth-inhibiting agent in air-containing water, and as a filtration-stimulating agent;

poly-electrolytes: used as a filtration-stimulating agent;

iron chloride: used as a filtration-stimulating agent;

oxygen scavenger: used to remove dissolved oxygen in the water;

corrosion inhibitor: used as a corrosion-inhibiting agent;

scale inhibitor: used as a scale-inhibiting agent, and preferably to prevent scaling in the reservoir; and biocide: used to kill bacteria both in air-containing water and in air-deficient water.

Insufficient bactericidal action may lead to souring of the reservoir, corrosion problems and a gradual accumulation of bacterial slime in the reservoir and in the well.

As an alternative or addition to water treatment by means of liquid chemicals, electro-chlorination (with or without copper-ion dosing) and/or UV-sterilization may also be used. Both methods are carried out on the surface installation.

Electro-chlorination makes use of a high-voltage unit, a so-called "cell", to convert a branch flow of seawater into a sodium hypochlorite solution and hydrogen. The hydrogen is vented off, while the hypochlorite solution is added to the mainstream of injection water in order to inhibit organism growth, but also to act as a filtration-stimulating agent. In another variant, a sacrificial copper anode is used in combination with low-concentration dosing of chlorine, after which a mixture containing copper-ions and hypochlorite is added to the mainstream of injection water.

UV-sterilization makes use of high-voltage lamps, which emit bactericidal ultraviolet rays (UV-rays). The stream of injection water is led past of a number of UV-lamps before being injected into the reservoir. This technique is normally used in addition to injection of liquid biocide into the injection water.

As mentioned, it is economically favourable to use subsea-placed production equipment for primary recovery of petroleum resources. When using water injection as a secondary recovery method, however, a surface installation is used, onto which all of the important water treatment- and injection equipment is placed. However, in principle it would be highly advantageous if the water treatment and the water injection could be carried out under water, thus rendering a very expensive surface installation superfluous. A significant improvement in the profitability concerning marginal petroleum resources thereby would be achieved, providing for these resources to become attractive recovery prospects. This would also increase the profitability of existing seabed-completed production wells, rendering possible for additional hydrocarbon volumes to be forced out of the reservoir at an affordable cost.

Recent studies have considered the possibilities of performing treatment and well injection of seawater while under water. In order to do so, substantially the following subsea-placed means must be used:

Equipment for treatment of untreated seawater;
at least one high-pressure injection pump;
at least one umbilical for electric power supply, control signals and chemical supply; and
appropriate wellhead equipment.

Most of this equipment is placed on or near a seabed.

In the studies, however, only two water treatment methods have been considered.

The first method consists in using electro-chlorination. As said means do not treat the water against other undesirable effects, including corrosion and scaling, these means provide insufficient treatment of the injection water for most injection wells and reservoirs.

The second method consists in adding liquid chemicals into the injection well via a supply line, for example a so-called umbilical, from a remote host installation onshore or offshore, for example a platform. However, the method is expensive, impractical and inflexible, inasmuch as the field of use for the method is limited, among other things, by the distance and seabed conditions between the host installation and said water treatment- and injection equipment on the seabed.

Said two methods are technically incomplete, inasmuch as they do not provide adequate treatment of the injection water and also are impractical and expensive. They do not replace the abovementioned and known injection water treatment methods, which are carried out on a surface installation, and which offer a complete selection of chemicals and equipment for treatment of the injection water, including treatment for preventing reservoir souring and scaling and associated plugging of the injection well and/or the reservoir.

OBJECT OF THE INVENTION

The object of the invention is to provide a method and an apparatus that provides for a complete treatment of injection water while under water, which renders use of a surface installation for treatment and injection of the water superfluous. Also, the technical extent and/or the technical complexity distinguishing prior art techniques thus is/are reduced, which significantly reduces the disadvantages of prior art techniques. Water injection therefore may be employed as a method of secondary recovery, both for marginal petroleum resources and in connection with existing, seabed-completed production wells, providing for a significant increase in their recovery factor and profitability.

HOW TO ACHIEVE THE OBJECT

The object is achieved by means of the features disclosed in the following description and in the subsequent claims.

In connection with the present method and apparatus, all main technical equipment for water treatment and injection are disposed under water, preferably on or near the relevant seabed. The main equipment may still be connected to a remote host installation offshore or onshore, the host installation supplying the main equipment with, for example, power, control signals, monitoring signals and/or similar. The main equipment may also be connected to various types of auxiliary equipment for carrying out service work, among other things, on the main equipment or other well equipment. This auxiliary equipment may include equipment components associated with the main equipment, including control- and measuring equipment, valves, connecting lines, connection equipment, potential protective structures and also filters and/or grates for separating particles of solids and/or organisms from untreated inlet water. Such auxiliary equipment may also comprise ROV-based equipment, in which an unmanned, underwater vehicle (ROV) carries out the specific service work by means of remote control from a host vessel on the surface. In the latter case, the specific water treatment- and injection equipment must be arranged for co-operation with said ROV-based equipment.

By means of the present method and apparatus, at least one of the following chemicals may be added to the injection water: chlorine, corrosion inhibitor, scale inhibitor and biocide. Other chemicals may also be used, including one or more of the abovementioned water treatment chemicals that, according to prior art, are added on a surface installation. According to the invention, electro-chlorination (with or without copper-ion dosing) and/or UV-sterilization may also be employed as water treatment methods.

The present method and apparatus are based on the use of at least one type of chemical that exists substantially in a solid state prior to use, and which is dissolved in water at an adjusted rate of dissolution. When water is brought into contact with at least one such solid-state chemical, the at least one chemical dissolves gradually and mixes with the water.

The water may be led continuously across and past the at least one solid-state chemical, for example a scale inhibitor, after which the chemical is dissolved slowly and gradually and continuously is added to the water in small amounts (low-concentration dosing).

Alternatively, or possibly in addition, the at least one solid-state chemical, for example biocide, may be dissolved gradually and be accumulated into a so-called high-concentration dose within a given volume of the water. Then, a so-called shock dosing of the at least one chemical is carried out, in which the entire water volume provided with said high-concentration dose is added rapidly into the stream of injection water. The shock dosing is carried out periodically, for example weekly, and is particularly favourable for killing bacteria and bacterial slime gradually accumulating in well pipes and in the reservoir.

The rate of dissolution in water of the at least one solid-state chemical is adjusted according to the relevant dosing requirement and dosing pattern. The dosing rate may be adjusted through appropriate control of the water flow rate across and past the chemicals and/or by providing the chemicals with solubility properties adapted to the specific dosing rate (of which both methods are known in the art).

The chemicals exist as at least one solid-state unit, and they may exist in a block form or in a particle form. In particle form they may exist, for example, as tablets, pills, granules and/or pellets of a suitable size and shape. Each solid-state unit contains at least one water treatment chemical and may also consist of at least one carrier material. Each solid-state unit thus may be a composite of different types of chemical grains, such a particle comprising at least one water treatment chemical and possibly also at least one carrier material of a chemical that is neutral to the water treatment.

Different types of solid-state units also may be mixed together, in which one particular unit type may have its own a specific chemical composition, while other unit types may have other specific chemical compositions. Solid-state units of different sizes, shapes and/or concentrations may also be mixed together in a desired quantity and having a desired distribution of unit types. As such, there are no limitations concerning possible combinations of unit types. Moreover, the solid-state chemicals must be devised/arranged in a manner allowing them to function as intended in their position of use under water, and at the relevant physical and chemical conditions, including pressure, temperature and chemical composition of the untreated injection water.

Thereby, solid-state units that are impregnated with, or otherwise are devised/arranged with, different chemical grains having of a desired chemical composition and chemical concentration, may be used. An example of this is pellets made from sintered powder containing scale inhibitor or biocide. Chemicals in the outer layer of the pellets are dissolved slowly and successively when in contact with water, after which the chemicals are gradually released to the stream of injection water.

Chemically impregnated solid-state particles are already being used in a relatively new method for preventing scaling in the production system of a production well. The method consists in pumping chemically impregnated propping material, i.e. a proppant, via well perforations and into artificial fractures in the reservoir during completion of the production well. When reservoir liquids subsequently flow out into the well and past the chemically impregnated proppant, scale inhibitor is gradually washed out of the proppant, providing chemical protection against scaling in the production system of the well. The method is used as an alternative to pressure injection of scale inhibitor into the reservoir. However, said method is directed at production of reservoir fluids, and not at water injection.

The present apparatus comprises at least one suitable receptacle containing said at least one solid-state chemical for treatment of untreated water. The apparatus thus may comprise an assembly of such receptacles, in which the receptacles may contain similar and/or dissimilar solid-state chemicals or compositions of such chemicals. Moreover, the chemicals have an individually adapted shape and compositions suitable for the relevant water treatment situation, cf. the abovementioned examples.

When said apparatus comprises several receptacles, the receptacles may also serve different purposes. For example, some receptacles may constitute auxiliary receptacles for chemicals. By so doing, the water may be led from an emptied chemical receptacle to a corresponding full chemical receptacle, thereby allowing the emptied receptacle to be replaced with a full receptacle without discontinuing the water injection operation. Preferably, one or more of the receptacles are replaceable and may exist as replaceable cassettes, cartridges or inserts containing at least one of the relevant chemicals. Thus, ROV-techniques and a simple host vessel may be used to replace the chemical receptacles when necessary.

One or more receptacles in the apparatus may also serve as holding receptacles for at least one type of solid-state chemical, for example biocide. Such receptacles are used for temporary storage of said volume of water in which the at least one solid-state chemical is dissolved into a high-concentration dose that periodically is shock-added into the stream of injection water. The apparatus may also be provided with other advantageous means of inhibiting organism growth, including electro-chlorination equipment (with or without copper-ion dosing) and/or UV-sterilization equipment. This equipment, however, carries out continuous treatment of the injection water, which constitutes a supplement to the periodic shock-addition of, for example, biocide into the injection water, and which complements the organism-inhibiting treatment of the water.

During the water treatment, injection water is led through or temporarily into at least one of said receptacles in the present water treatment apparatus. The apparatus may also provide treatment of water for several injection wells. In this case, the apparatus must be provided with a sufficient number of receptacles of said type(s) in order to treat water for all injection wells, for example an individually assembled set of receptacles for each injection well and possibly other water treatment equipment. The apparatus is also provided with at least connection equipment for each injection well.

By means of control engineering and auxiliary equipment known per see, branch flows of the stream of injection water may be led through the receptacles of the water treatment apparatus and any other water treatment equipment, as desired. By means of this equipment, flow rates and/or flow paths of the branch flows, possibly also their flow intervals, may be controlled optimally. Suitable remote control cables and/or power supply cables may be used for these purposes.

After treatment, the water is led onwards to the injection pumping equipment of the well (which is prior art). When the water treatment apparatus provides water treatment for several injection wells, known control engineering is also used to control branch flows of treated water to the injection pumping equipment of the relevant wells. Then the injection water is pumped at a high pressure down into the injection well and out into the reservoir. The injection pumping equipment forms part of the main equipment, and, as mentioned, may be powered and operated remotely. Alternatively, the main equipment may receive power, control signals and similar from local subsea units.

Said water treatment apparatus and injection pumping equipment may be assembled within one or more modules. When using several modules, at least one of these may be removably and replaceably connected to other modules, allowing it to be readily connected or disconnected by means of ROV-techniques. For example, the removable module may contain receptacles with solid-state chemicals that are replaced regularly by means of a service vessel on the surface. Which module solution is most appropriate depends, among other things, on the number of injection wells the apparatus is to serve, the relevant water injection rate(s), water and seabed conditions, and also the type(s) of water treatment to be carried out. The at least one module is lowered into the water and preferably is placed on the seabed, and preferably in proximity of the relevant wellhead(s).

SHORT DESCRIPTION OF THE DRAWING

In the following, a non-limiting example of an embodiment of the present invention and an associated drawing is shown, in which:

FIG. 1 schematically shows a water treatment apparatus according to the invention, in which the apparatus is disposed on a seabed together with pumping equipment for injection of treated water into an injection well.

The FIGURE only shows the main equipment of the apparatus, which is very distorted with respect to relative dimensions, and which is shown having a very simplified design and abundance of detail.

DESCRIPTION OF AN EXAMPLE OF AN EMBODIMENT OF THE INVENTION

FIG. 1 shows a water treatment apparatus 10 according to the invention being disposed in its position of use on a seabed 12. The apparatus 10 and a connected high-pressure injection pump 14 are removably connected to a foundation 16 on the seabed 12. The apparatus 10 is connected to the high-pressure pump 14 via a supply line 15. On its downstream side, the high-pressure pump 14 is connected to a high-pressure line 18 leading onwards to a nearby injection wellhead (not shown in the FIGURE). Moreover, the equipment is on the foundation 16 is connected to the necessary cables for supply of power, control signals and similar (not shown in the FIGURE).

In this example of an embodiment, the apparatus 10 exists as a module consisting of an external, protective frame 20 within which all water treatment equipment is placed. At the upper end thereof, the frame 20 is provided with lifting lugs 22, or any other necessary connections, for lifting or lowering the apparatus 10 from a surface vessel (not shown). At this end, the frame 20 is also provided with an inlet chamber 24, for example a funnel-like chamber (as shown in the FIGURE) or any configuration of an inlet chamber, through which untreated seawater 26 is sucked into the apparatus 10. The inlet chamber 24 is also associated with at least one filtering device 27, for example a grate and/or a filter, for separating out any organic and inorganic particles in the untreated, inflowing seawater 26. To prevent ingress of larger solids and marine life, a grate or similar may be used at the entrance of the inlet chamber 24. However, the inlet chamber 24 and the filtering device 27 are shown very schematically in FIG. 1. The seawater 26 then flows on through the relevant water treatment equipment in the apparatus 10 and onwards through the supply line 15 to said high-pressure pump 14. Then the high-pressure pump 14 pumps fully treated seawater 26' onwards to the injection well. Arrows in the FIGURE indicate the direction of flow of the water 26, 26'.

At its lower end, the frame 20 is provided with a connector 28 that is arranged for removable connection with a co-operating connector 28' on a base 29 mounted on the foundation 16. The apparatus 10 thus may be readily connected to or disconnected from the foundation 16.

In this example of an embodiment, the seawater 26 may be led through three successive water treatment levels 30, 31, 32 in the apparatus 10, the water 26 being led through suitable lines 34 that connects the water treatment equipment at the different levels 30, 31, 32 in the apparatus 10. This network of lines also is provided with suitable valves 36 for suitable control of branch flows of seawater 26 to the relevant water treatment equipment. The valves 36 are controlled by means of suitable control devices (not shown).

At the first, most upstream water treatment level 30, two receptacles in the form of replaceable cassettes 38, 40 are placed, each of which containing biocide pellets 42. However, cassette 40 is an auxiliary cassette for use when cassette 38 is empty. Also, each cassette 38, 40 functions as a holding receptacle, into which a given volume of untreated seawater 26 is led and gradually dissolves the biocide pellets therein. The dissolved and accumulated high-concentration dose of biocide is periodically shock-dosed into the stream of injection water. During periods between the shock-doses, untreated seawater 26 bypasses the cassettes 38, 40 via a bypass line 44 provided with a valve 36' that is maintained closed during biocide shock-dosing, and which is controlled by means of a suitable control device. However, valves 36 immediately upstream and downstream of the relevant cassette 38, 40 are maintained open.

At the second and intermediate water treatment level 31, three replaceable cassettes 46, 48, 50 are placed, and they contain pelletized chlorine 52, pelletized corrosion inhibitor 54 and pelletized scale inhibitor 56, respectively. Seawater 26 is continuously led across and past each of these solid-state chemicals, dissolving them slowly and gradually. By doing so, the water 26 continuously receives a low-concentration dose of the relevant chemical.

At the third and most downstream water treatment level 32, continuous UV-sterilization and electro-chlorination of the seawater 26 is carried out. Among other things, the water 26 is led through two receptacles 58, 60 containing UV-lamps 62 that emit bactericidal ultraviolet rays. A third receptacle 64 contains a high-voltage cell 66 that converts seawater 26 into sodium hypochlorite, among other things, which inhibits growth of organisms, and which is added to the stream of injection water. These receptacles 58, 60, 64 may also be replaceable in order to allow, for example, maintenance of one or more of these, and they may also exist in any desirable number in the apparatus 10. Moreover, receptacles 58, 60, 64 may just as well be stationary, and they may be serviced by disconnecting the entire apparatus 10 from the foundation 16 and hoisting it to the surface.

Water treatment equipment in the apparatus 10 may also be arranged in a different order, with a different amount of equipment and possibly with additional equipment than that described in this example of an embodiment.

The invention claimed is:

1. A method for treatment of untreated injection water for a subsea injection well, said injection water being one of:
   (A) water from a body of water overlying the injection well, and
   (B) produced water from a well production stream; said method comprising:
      lowering a water treatment apparatus and a water injection pumping equipment connected thereto into said body of water overlying the subsea injection well,
      said water treatment apparatus comprising at least one module provided with at least one receptacle and an associated network of lines with valves for allowing flow of injection water through said receptacle and line network during water injection into subsea well, and
      said at least on receptacle being provided with at least one type of water-soluble, solid state chemical;
      connecting the water treatment apparatus and the water injection pumping equipment to the subsea injection well;
      bringing said water into contact with the at least one solid-state chemical within the at least one receptacle, thereby causing said solid-state chemical to gradually dissolve and mix with the contacting water, treated water thus emanating from said receptacle; and
      leading the treated water into an injection stream conveyed into the injection well and further into an associated reservoir.

2. The method according to claim 1, comprising providing the at least one receptacle with at least one solid-state unit of the at least one chemical.

3. The method according to claim 2, comprising providing the at least one receptacle with at least one solid-state chemical unit having at least one of the following forms: block, tablet, pill, granule and pellet.

4. The method according to claim 1, 2 or 3, comprising providing the at least one receptacle with at least one of the following types of solid-state chemicals:
   Chlorine;
   poly-electrolytes;
   iron chloride;
   oxygen scavenger;

corrosion inhibitor;
scale inhibitor; or
biocide.

5. The method according to claim 1, comprising arranging one or more receptacles as replaceable receptacles.

6. The method according to claim 5, comprising arranging one or more receptacles as replaceable cassettes, cartridges or inserts.

7. The method according to claim 1, comprising arranging one or more receptacles for continuous flow of the water across and past the at least one chemical therein.

8. The method according to claim 1, comprising arranging one or more receptacles for periodical shock-dosing of the at least one chemical therein.

9. The method according to claim 1, comprising also connecting the apparatus, via said network of lines and associated valves, to at least one UV-sterilization receptacle in which at least one UV-lamp is placed for bactericidal action in water flowing therethrough.

10. The method according to claim 1 or 9, comprising also connecting the apparatus, via said network of lines and associated valves, to at least one electro-chlorination receptacle in which a high-voltage cell is placed for inhibiting organism growth in water flowing therethrough, inasmuch as electro-chlorination may be carried out with or without copper-ion dosing.

11. The method according to claim 1, comprising arranging the apparatus removably on a foundation on a water bed in proximity of the subsea well.

12. An apparatus for treatment of untreated injection water for a subsea injection well, wherein the water treatment apparatus is structured for connection to a water injection pumping equipment so as to allow said apparatus and pumping equipment to be lowered into a body of water overlying the subsea injection well and then to be connected to the injection well;
wherein said apparatus comprises at least one module provided with at least one receptacle and an associated network of lines with valves for allowing flow of injection water through said receptacle and line network during water injection into the subsea well; and
wherein the at least one receptacle contains at least one type of water-soluble, solid-state chemical for treatment of the water admitted into the receptacle;
whereby said apparatus is structured in a manner allowing untreated injection water to enter said receptacle and contact said solid-state chemical so as to gradually dissolve and mix with the contacting water, treated water thus emanating from said receptacle to be conveyed into the injection well and further into an associated reservoir.

13. The apparatus according to claim 12, wherein the at least one solid-state chemical exists in at least one of the following forms: block, tablet, pill, granule and pellet.

14. The apparatus according to claim 12 or 13, wherein the solid-state chemical is at least one of the following types of chemicals:
Chlorine;
poly-electrolytes;
iron chloride;
oxygen scavenger;
corrosion inhibitor;
scale inhibitor; or
biocide.

15. The apparatus according to claim 12, wherein one or more receptacles are replaceable.

16. The apparatus according to claim 15, wherein one or more receptacles are replaceable cassettes, cartridges or inserts.

17. The apparatus according to claim 12, wherein one or more receptacles are arranged for continuous flow of the water across and past the at least one chemical therein.

18. The apparatus according to claim 12, wherein one or more receptacles are arranged for periodical shock-dosing of the at least one chemical therein.

19. The apparatus according to claim 12, wherein the apparatus also is connected, via said network of lines and associated valves, to at least one UV-sterilization receptacle in which at least one UV-lamp is placed for bactericidal action in water flowing therethrough.

20. The apparatus according to claim 12 or 19, wherein the apparatus also is connected, via said network of lines (34, 44) and associated valves, to at least one electro-chlorination receptacle in which a high-voltage cell is placed for inhibiting organism growth in water flowing therethrough, inasmuch as electro-chlorination may be carried out with or without copper-ion dosing.

21. The apparatus according to claim 12, wherein the apparatus is removably connected to a foundation on a water bed in proximity of the subsea well.

* * * * *

UNITED STATES PATENT AND TRADEMARK OFFICE
CERTIFICATE OF CORRECTION

| | | |
|---|---|---|
| PATENT NO. | : 7,731,843 B2 | Page 1 of 1 |
| APPLICATION NO. | : 10/552202 | |
| DATED | : June 8, 2010 | |
| INVENTOR(S) | : Dave Pinchin | |

It is certified that error appears in the above-identified patent and that said Letters Patent is hereby corrected as shown below:

At column 7, line 7, please delete "equipment is" and insert --equipment--.

Signed and Sealed this
Nineteenth Day of June, 2012

David J. Kappos
*Director of the United States Patent and Trademark Office*